Patented Oct. 17, 1944

2,360,405

UNITED STATES PATENT OFFICE 2,360,405

REGENERATED CELLULOSIC FILM COAGULATING BATH

Donald Ellsworth Drew, Kenmore, N. Y., assignor to E. I. du Pont de Nemours & Company, Wilmington, Del., a corporation of Delaware No Drawing. Application December 1, 1939, Serial No. 307,048

4 Claims. (Cl. 18—57)

This invention relates to the manufacture of regenerated cellulosic products, especially baths for the coagulation and/or regeneration of viscose. More particularly it relates to regenerated cellulose films (or pellicles) having uniform thickness and appearance.

The manufacture of regenerated cellulose film in a continuous manner from viscose is disclosed in U. S. A. Patent No. 1,548,864 (Brandenberger). This procedure, which is particularly well suited to commercial scale operation and which may be readily modified for the formation of pellicles other than film, in general involves continuous extrusion of a sheet of cellulose xanthate solution (viscose) through a narrow slot directly into a coagulating (and/or regenerating) bath. The extruded web is kept in this bath until it has acquired the mechanical strength necessary to withstand the subsequent treatments which it is to receive.

The extrusion slot or orifice is usually formed by a pair of parallel metal bars, called hopper lips. Experience indicates that a regenerated cellulose sheet product having uniform thickness, appearance and other characteristics, cannot be obtained unless the extrusion orifice is of precise and uniform width. If the lips of the orifice become roughened, even minutely, as by the adherence of particles, streaked, inferior pellicles result. When such a condition exists the lips must be removed and repaired. Such repairs involve teriffic expense, not only because of the time and labor required for the correction of the defect, but also because of the losses involved in the stoppage of the expensive regenerating machine. In addition, the defects may not be immediately noticed or corrected, and as a result a substantial amount of defective pellicular material may be produced.

Generally the setting (coagulating and/or regeneration) bath contains sulfuric acid which causes the liberation of free sulphur in finely divided or colloidal condition during the regeneration reaction. These particles of sulfur coalesce about the orifice, forming deposits which cause streaks, scratches, and other irregularities in the extremely delicate and plastic surface of the pellicle. A similar coalescence on other parts of the handling and/or transferring apparatus (for example, the guide members used in the bath) is recognized as the basis of further and similar difficulties in manufacture.

A considerable amount of research has lead to the present discovery, according to which a material is added to the coagulating bath for the purpose of curbing, restraining or repressing the deposit of solid particles (usually in the form of a gummy mass) on the hopper lips and other parts of the apparatus. This enables the regenerating machine to be operated for far longer periods of time without stoppage or interruption for overhauling.

This invention had for an object the improvement of the coagulation and/or regeneration steps in the manufacture of non-fibrous cellulosic pellicles from aqueous dispersions. Other objects were to manufacture regenerated cellulosic pellicles free from streaks, scratches and other blemishes, and to manufacture non-fibrous cellulosic pellicles of uniform thickness and appearance. A still further object was to provide a method of producing cellulosic pellicles free from visible imperfections over long periods of time without contamination of the producing apparatus. Yet further objects were to provide an apparatus for the production of transparent cellulosic pellicles which would not be subject to contamination with foreign matter, for example, sulfur, and to produce continuous regenerated cellulose webs from viscose with an apparatus and in a process in which a coalescence of sulfur particles on the casting hopper lips was repressed or prevented. A general advance in the art, and other objects which will appear hereinafter, are also contemplated.

It has now been found that the presence of a small proportion of an alkyl substituted benzene sulfonic acid in a coagulating and/or regenerating bath comprising an acid (such as sulfuric acid) and a salt (such as sodium sulfate) will prevent the formation of a gummy deposit on the hopper lips in the casting of regenerated cellulose film.

From the following description and specific examples, in which are disclosed certain embodiments of the invention as well as details of what is believed to be the best mode for carrying out the invention, it will be apparent how the foregoing objects and related ends are accomplished. The parts are given by weight throughout the application, unless otherwise specified.

Example I

Viscose containing 8% cellulose and 6% alkali was extruded through a slot into a bath comprising essentially water, 11.5% sulfuric acid, 20% sodium sulfate, and 0.004% substituted phenyl sulfonic acid of the formula:

The proportions of the ingredients in the bath were maintained constant. It was possible to operate continuously for 100 hours without the necessity of removing foreign matter from the extrusion orifice or from the other surfaces from which the cellulosic pellicle came into contact, and still produce a pellicle free from surface blemishes in the coagulating and/or regenerating bath.

When operating with the same viscose and with a corresponding setting bath omitting the alkyl phenyl sulfonic acid under the same conditions, it was found necessary to cleanse the extrusion orifice and remove foreign matter on an average of once in twelve hours. The foreign matter so removed consisted mainly of deposits of sulfur.

Example II

Viscose containing 7.5% cellulose and 6.5% sodium hydroxide was extruded as a pellicle into an aqueous bath comprising 12.5% sulfuric acid, 19% sodium sulfate and 0.01% of the alkyl substituted phenyl sulfonic acid having (in acid form) the structure:

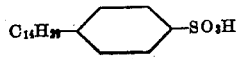

With this particular bath the extrusion proceeded smoothly and no scratching or marring of the film was observed to take place in the coagulating and/or regenerating for over a period of 670 hours. When a similar film was cast into a similar bath without the sulfonic acid, it was found necessary to remove foreign matter from the lips of the extrusion orifice and from the guide members within the bath after 10 hours' operation. When this 10 hour cleansing did not take place, the surface of the resulting regenerated cellulose web was marred and scratched.

Example III

Viscose containing 7.5% cellulose and 6.5% sodium hydroxide was extruded as a pellicle into an aqueous bath comprising 12.5% sulfuric acid, 19% sodium sulfate and 0.008% of a mixture of alkyl substituted phenyl sulfonic acids in which the alkyl groups were straight chains containing from 10 to 14 carbon atoms (averaging 12.5 carbon atoms). It was possible to operate this bath in excess of 240 hours without any attention whatsoever to the removal of foreign matter from the lips of the extrusion orifice and from the guide members within the bath.

Example IV

Viscose containing 7.5% cellulose and 6.5% sodium hydroxide was extruded as a pellicle into an aqueous bath comprising 12.5% sulfuric acid, 19% sodium sulfate and 0.009% of a mixture of monosulfonated alkyl benzenes in which the alkyl groups had an average carbon content of 10 and were mono branched chain. With this bath the extrusion proceeded smoothly, and the regeneration and/or coagulation continued for over 400 hours before it become desirable to remove foreign matter from the hopper lips in order to avoid scratching, marring and other irregularities in the resulting film.

The improvement described above is apparently not limited to the viscose regeneration of the aforementioned U. S. A. Patent 1,548,864. Considerable improvement is also obtained with the cuprammonium process and the alkali soluble lowly esterified and lowly etherified cellulose procedures.

The greatest improvement seems to be obtained in the case of coagulating and/or regenerating baths comprising sulfuric acid and sodium sulfate operating upon casting solutions which liberate sulfur.

The concentration of the alkyl phenyl sulfonic acid may vary from 0.002% to 0.02% of the bath, preferably between 0.004% and 0.003%. No disadvantage has been experienced in using proportions greater than the maximum of the above range, but the effect is not proportionately greater. In general the greater the alkalinity of the viscose the more effective are the smaller amounts of the alkyl phenyl sulfonic acids.

The substituted phenyl sulfonic acids found most desirable are comprehended by the following general formula:

in which R is an aliphatic radical containing 10 to 14 carbon atoms (inclusive). A mixture of such compounds in which R has an average value of 12.5 carbon atoms, is quite advantageous. The alkyl substituted phenyl sulfonic acid may be added to the bath either as the free acid or as a soluble salt (for example, the sodium salt). The tri-isobutyl-phenyl-mono-sulfonic acid may also be utilized if desired.

It has been observed that the alkyl phenyl sulfonic acids of this invention are extremely well suited to the prevention of deposits of foreign matter from baths used to coagulate and baths used to regenerate cellulose from aqueous (preferably alkaline) cellulosic dispersions such as viscose. They are particularly effective at higher temperatures, which is very advantageous because the precipitation of sulfur and other foreign matter upon the solid surfaces contacting the web have been found to be particularly great at elevated temperatures.

The greatest advantages of the present invention are believed to be clear from the foregoing portions of the specification. These may be summarized as lower maintenance costs, and longer continuous production periods resulting from the prevention of scratching, surface marring and change in thickness of the film (or other pellicle) by the extrusion orifice and other parts of the apparatus.

As many apparently widely different embodiments of this invention may be made without departing from the spirit and scope thereof, it is to be understood that this invention is not limited to the specific embodiments thereof except as defined in the appended claims.

I claim:

1. A regenerated cellulose film setting bath comprising essentially water, sulfuric acid, sodium sulfate and 0.002% to 0.02% of material of the formula:

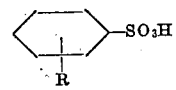

in which R represents an aliphatic radical containing 10 to 14 carbon atoms.

2. A regenerated cellulose film setting bath comprising essentially water, 12.5% sulfuric acid, 19% sodium sulfate and 0.002% to 0.02% of a mixture of compounds of the formula:

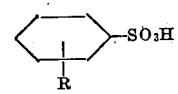

in which R represents aliphatic radical containing 10 to 14 carbon atoms and averaging 12.5 carbon atoms for the mixture.

3. A regenerated cellulose film setting bath comprising essentially water, sulfuric acid, sodium sulfate and 0.002% to 0.02% of a mixture of compounds of the formula:

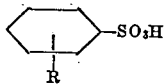

in which R represents an aliphatic radical containing 10 to 14 carbon atoms and averaging 12.5 carbon atoms for the mixture.

4. A regenerated cellulose film setting bath comprising essentially water, 12.5% sulfuric acid, 19% sodium sulfate and 0.002% to 0.02% of material of the formula:

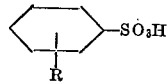

in which R represents aliphatic radical containing 10 to 14 carbon atoms.

DONALD E. DREW.